(12) United States Patent
Furukawa et al.

(10) Patent No.: US 8,167,500 B2
(45) Date of Patent: May 1, 2012

(54) BEARING APPARATUS FOR AXLE

(75) Inventors: Keiichi Furukawa, Nara (JP); Yutaka Koma, Hachioji (JP); Shigeru Inoue, Yokohama (JP); Masafumi Masuda, Tokushima (JP); Yoshishige Kasai, Tokushima (JP); Shunichi Fujiwara, Tokushima (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 496 days.

(21) Appl. No.: 12/379,554

(22) Filed: Feb. 24, 2009

(65) Prior Publication Data

US 2009/0220182 A1 Sep. 3, 2009

(30) Foreign Application Priority Data

Feb. 25, 2008 (JP) ................................ P2008-043018

(51) Int. Cl.
- *F16C 33/76* (2006.01)
- *F16C 43/04* (2006.01)
- *F16J 15/00* (2006.01)
- *F01D 11/00* (2006.01)

(52) U.S. Cl. ........ 384/484; 384/477; 384/486; 384/586; 277/345; 277/349

(58) Field of Classification Search .................. 384/448, 384/477–478, 484–486, 544, 586, 589; 277/349, 277/345, 353, 549, 571

See application file for complete search history.

(56) References Cited

U.S. PATENT DOCUMENTS

| 3,510,138 | A | * | 5/1970 | Bowen et al. ............... 384/478 |
| 3,659,901 | A | | 5/1972 | Porsche et al. |
| 3,772,549 | A | | 11/1973 | Cumming |
| 4,427,202 | A | * | 1/1984 | Backlin ........................ 277/349 |
| 5,470,157 | A | | 11/1995 | Dougherty et al. |
| 5,813,675 | A | * | 9/1998 | Otto ............................. 277/549 |
| 5,887,875 | A | | 3/1999 | Salciccioli et al. |
| 6,126,322 | A | | 10/2000 | Otsuki et al. |
| 7,156,400 | B2 | * | 1/2007 | Oates ........................... 384/486 |
| 7,793,939 | B2 | * | 9/2010 | Ishikawa et al. ............. 384/484 |

(Continued)

FOREIGN PATENT DOCUMENTS

DE  100 09 216 A1  8/2001

(Continued)

OTHER PUBLICATIONS

European Search Report dated Jun. 17, 2009.

*Primary Examiner* — Marcus Charles
(74) *Attorney, Agent, or Firm* — McGinn IP Law Group, PLLC

(57) ABSTRACT

An inner ring, an outer ring, a circular cone roller constituting a rolling elements arranged between the inner ring and the outer ring, a first seal member arranged at an opening portion between the inner ring and the outer ring, and a second seal member arranged on an outer side in an axial direction of the first seal member are provided, the second seal member includes a core fixed to the outer ring, an elastic ring-like member fixedly attached to the core and having at least one lip, and an outward attached slinger having a section in a channel-like shape fixed to the inner ring to cover the core and the elastic ring-like member and having a portion of a section in an L-like shape and a circular cylinder shape portion.

18 Claims, 4 Drawing Sheets

U.S. PATENT DOCUMENTS

| | | |
|---|---|---|
| 2003/0031393 A1 * | 2/2003 | Bellufi .................. 384/486 |
| 2006/0045400 A1 | 3/2006 | Yamamoto |
| 2007/0076994 A1 | 4/2007 | Norimatsu et al. |
| 2008/0031556 A1 | 2/2008 | Heim et al. |
| 2009/0153136 A1 | 6/2009 | Kobayashi |

FOREIGN PATENT DOCUMENTS

| | | |
|---|---|---|
| DE | 10 2004 044 118 A1 | 3/2006 |
| EP | 1 679 518 A1 | 7/2006 |
| JP | 3-121216 | 12/1991 |
| JP | 4-25024 (U) | 2/1992 |
| JP | 7-186604 | 7/1995 |
| JP | 2001-510534 | 7/2001 |
| JP | 2005-291485 | 10/2005 |
| JP | 2006-105304 | 4/2006 |
| JP | 2006-349062 | 12/2006 |
| JP | 2007-132454 | 5/2007 |
| JP | 2007-271488 (A) | 10/2007 |

* cited by examiner

UPPER SIDE

LOWER SIDE

BEARING APPARATUS FOR AXLE

BACKGROUND OF THE INVENTION

1. Field of the Invention

The present invention relates to a bearing apparatus for an axle of a vehicle of an automobile, a truck or the like, further in details, relates to a bearing apparatus for an axle including a seal member of preventing muddy water from invading an inner side of a bearing portion.

2. Related Art

A bearing portion of a bearing apparatus for an axle of a background art is constituted by an inner ring, an outer ring, a roller and a retainer.

The bearing portion includes a seal member for sealing an opening portion of an outer side and an inner side constituting end portions in an axial direction of an inner ring and an outer ring of the bearing portion.

The seal member is constituted by including a core having a section in an L-like shape fixed to an inner peripheral face of the end portion in the axial direction of the outer ring, an elastic member fixedly attached to the core, and a slinger having a section in an L-like shape fixed to an outer peripheral face of the end portion in the axial direction of the inner ring.

Further, the elastic member includes three lips at a front end thereof and the lips are brought into close contact with the slinger.

The seal member seals an inner space of the bearing portion against an outer space of the bearing portion by bringing the lips of the elastic member fixedly attached to the core into close contact with the slinger.

Further, the seal member prevents muddy water or the like from invading an inner side of the seal member per se from an outer portion thereof by arranging the slinger such that a gap between a diameter direction portion of the slinger and an axial direction portion of the core (labyrinth) becomes as small as possible. (Refer to, for example, JP-A-7-186604).

Although flow-out of a lubricant and invasion of muddy water are prevented by mounting the seal member to the opening portion on the inner side and the outer side of the inner ring and the outer ring in the background art in this way, there is a case in which a seal performance is insufficient only thereby, and therefore, various measures are taken on the inner side at which invasion of muddy water is particularly significant to achieve an effect.

Although a sufficient sealing property can be maintained in useful life requested for a general passenger vehicle, when maintenance-free of an extremely long period of time requested for a large-sized truck is used, a probability by which muddy water or the like invades the inner portion from the gap of the seal portion becomes high.

Further, when as a result of the invasion of the muddy water, the muddy water or the like is made to percolate in an interval between the lip of the elastic member and the slinger, the seal property of the lip is deteriorated, muddy water or the like invading the inner portion of the seal member passes through the lip of the elastic member, passes through even the gap between the diameter direction portion of the core and the slinger, and it is conceivable that the life of the bearing portion is reduced owing to the invasion of water from the seal portion.

SUMMARY OF THE INVENTION

Hence, it is an object of the invention to provide a bearing apparatus for an axle capable of maintaining an excellent sealing property over a long period of time by enabling to prevent invasion of muddy water or the like from an outer portion over a long period of time by strengthening a sealing property of a seal member.

A bearing apparatus for an axle according to the invention is constituted by including an inner ring, an outer ring, a rolling element arranged between the inner ring and the outer ring, a first seal member arranged at an opening portion between the inner ring and the outer ring, and a second seal member arranged on an outer side in an axial direction of the first seal member, wherein the second seal member includes a core fixed to the outer ring, an elastic ring-like member fixedly attached to the core and having at least one lip, and an outward attached slinger having a portion of a section in an L-like shape fixed to the inner ring to cover the core and the elastic ring-like member.

Further, a portion covering the core of the outward attached slinger includes an inclined face having a small diameter on an outer side in an axial direction and a large diameter on an inner side thereof.

Further, the second seal member is provided with a pulsar portion in a circular ring shape or a circular cylinder shape.

As described above, according to the bearing apparatus for an axle of the invention, the second seal member is arranged on the outer side in the axial direction of the first seal member arranged at the opening portion on the inner side which is easy to be splashed with muddy water of the inner ring and the outer ring of the bearing portion, and therefore, muddy water hardly splashes directly to the first seal member, and therefore, damage of the first seal member is restrained, and invasion of muddy water from the inner side to inside of the bearing portion can be prevented over a long period of time.

Further, the second seal member includes the core fixed to the outer ring, the elastic ring-like member fixedly attached to the core and having at least one lip, and the outward attached slinger having the portion of the section in the L-like shape fixed to the inner ring to cover the core and the elastic ring-like member, the lip of the elastic ring-like member is brought into contact with the inner face of the outward attached slinger, and therefore, the lip seals the gap between the slinger and the core of the first seal member by hampering muddy water invaded from the gap between the outward attached slinger and the core of the second seal member, and therefore, muddy water can be hampered from being splashed directly to the first seal member, invasion of muddy water from the inner side to inside of the bearing portion can be prevented over a long period of time, and the bearing apparatus for an axle having high reliability which is free of maintenance over a long period of time can be provided.

Further, the portion of covering the core of the outward attached slinger includes the inclined face having the small diameter on the outer side in the axial direction and the large diameter on the inner side, and therefore, at an outer side portion of the seal member (when disposed on an upper side), water adhered to the inclined face of the portion of covering the core of the outward attached slinger flows to other end side portion of covering the elastic ring-like member of the outward attached slinger, finally drops to a lower side of an outer portion. Therefore the water hardly invades the gap between the outward attached slinger and the core of the second seal member, further, muddy water invading the gap between the outward attached slinger and the core of the second seal member flows out to outside from the gap between the outward attached slinger and the core since the portion covering the core of the outward attached slinger is inclined downward at a lower side portion of the seal member (when disposed on a lower side), thereby, muddy water can further be prevented from being splashed to the first seal member.

Further, the second seal member is provided with the pulsar portion, and therefore, a rotation speed can be detected by a simple structure.

DETAILED DESCRIPTION OF THE PREFERRED EMBODIMENTS

Embodiment 1

Figure 1:
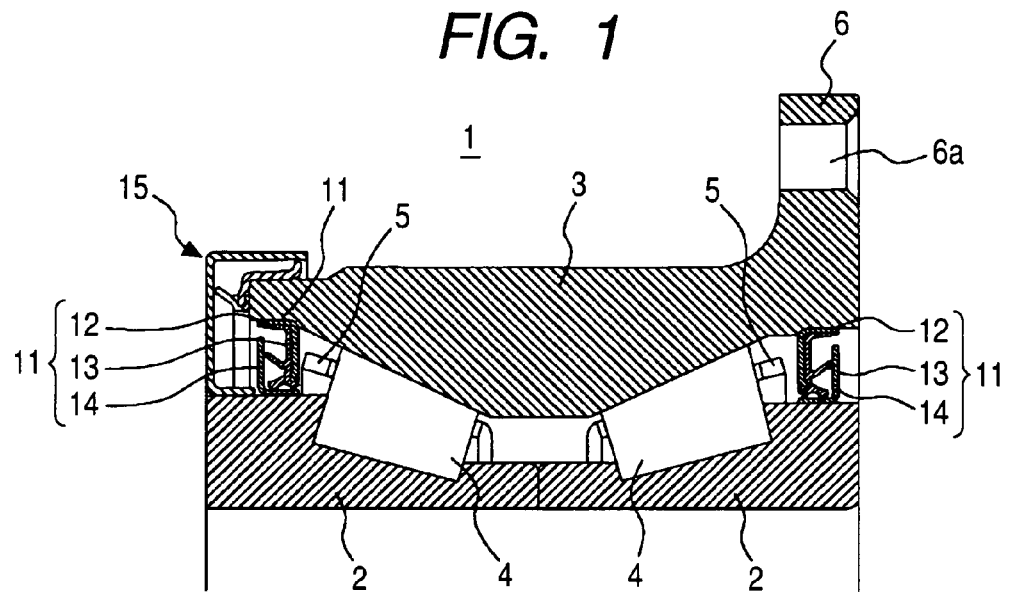
FIG. 1 is a vertical sectional view of a bearing apparatus for an axle according to Embodiment 1 of the invention.
Figure 2:
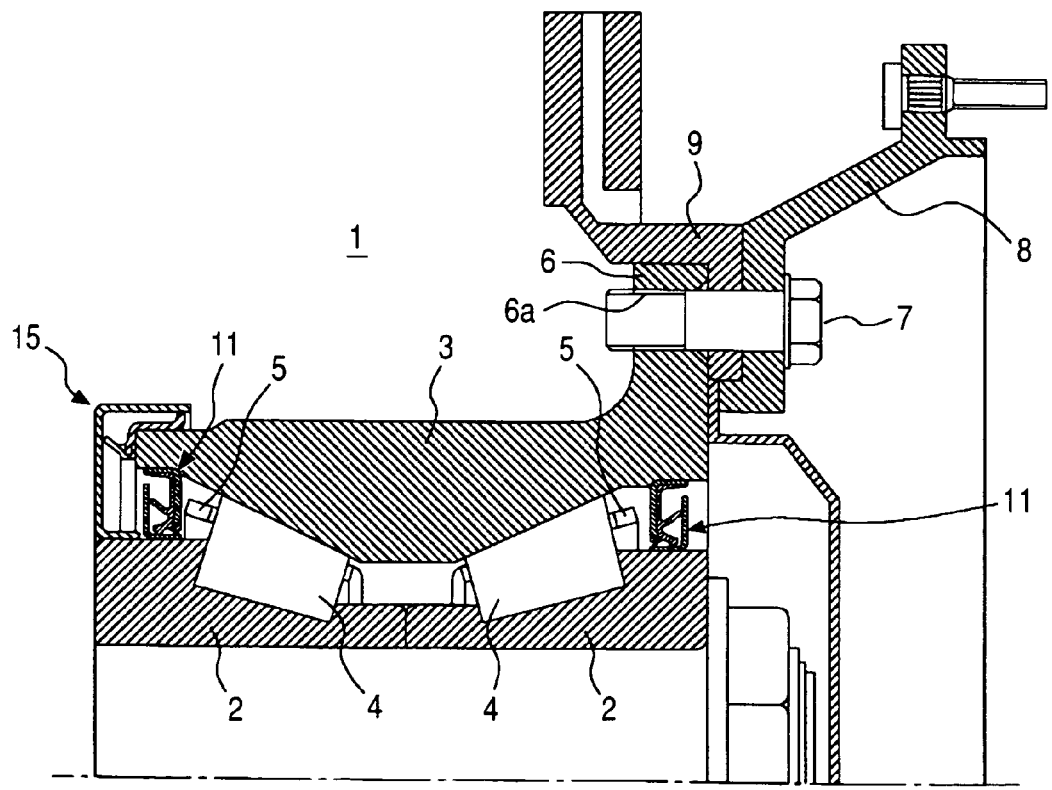
FIG. 2 is a vertical sectional view of a bearing portion of the bearing apparatus for an axle.
Figure 3:
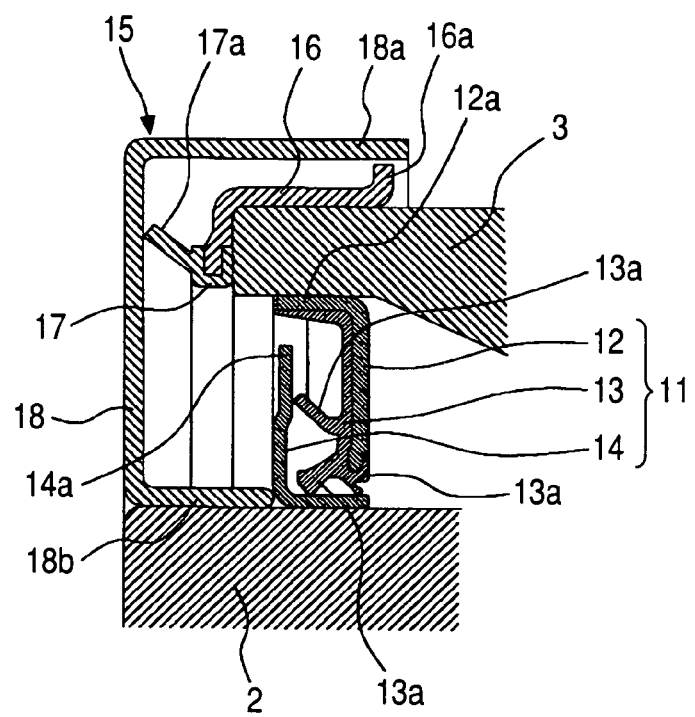
FIG. 3 is a vertical sectional view showing an upper side portion of a seal member of the bearing apparatus for an axle.
Figure 4:
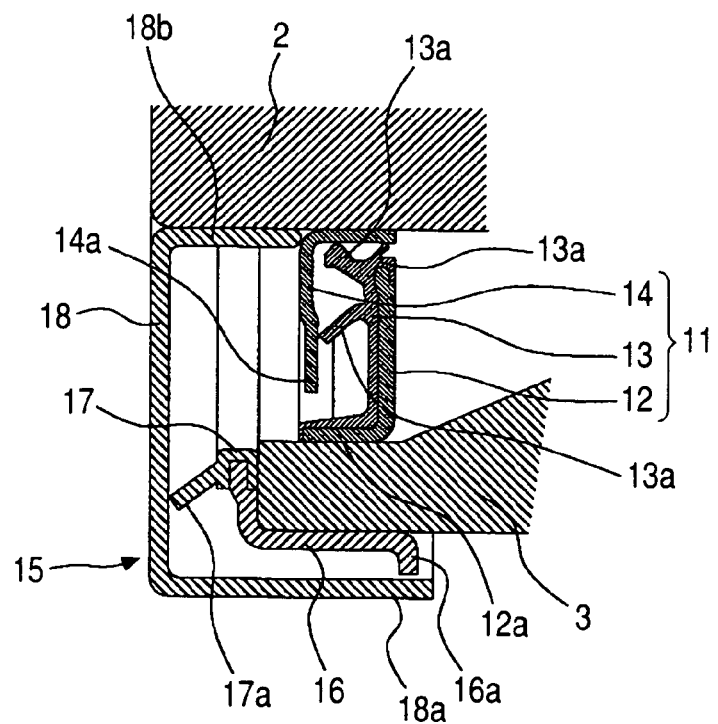
FIG. 4 is a vertical sectional view showing a lower side portion of the seal member of the bearing apparatus for an axle.

FIG. 1 is a vertical sectional view of a bearing apparatus for an axle according to Embodiment 1 of the invention, FIG. 2 is a vertical sectional view of a bearing portion of the bearing apparatus for an axle, FIG. 3 is a vertical sectional view showing an upper side portion of a seal member of the bearing apparatus for an axle, and FIG. 4 is a vertical sectional view showing a lower side portion of the seal member of the bearing apparatus for an axle.

The bearing apparatus for an axle of Embodiment 1 of the invention includes a bearing portion 1 of an outer ring rotating type.

The bearing portion 1 includes an inner ring 2 comprising a steel material of a steel material for a bearing or the like provided with rolling contact faces (raceway faces) between flange portions respectively provided at both end portions in an axial direction by being divided into two, an outer ring 3 comprising a steel material of a steel material for a bearing or the like provided with two rows of rolling contact faces in correspondence with the rolling contact faces of the inner ring 2, and circular cone rollers 4 comprising a steel material of a steel material for a bearing or the like constituting rolling elements rollably held respectively at pockets of a retainer 5 and arranged in two rows between the rolling contact faces of the inner ring 2 and the outer ring 3.

One end side in an axial direction of the outer ring 3 is provided with a flange 6 having a bolt hole 6a. The flange 6 is coupled with a wheel plate 8 and a brake plate 9 fixed to the bolt hole 6a by a bolt 7.

Seal members 11 are arranged respectively at opening portions on inner sides and on outer sides of end portions in an axial direction of spaces between the inner ring 2 and the outer ring 3.

The first seal member 11 includes a core 12 comprising a cold rolled steel sheet, stainless steel or the like having a section in an L-like shape fixed to an inner peripheral face of an end portion in an axial direction of the outer ring 3, an elastic ring-like member 13 comprising, for example, rubber or the like fixedly attached to the core 12, and a slinger 14 made of a metal having a section in an L-like shape fixed to an outer peripheral face of an end portion in an axial direction of the outer ring 3.

Further, the elastic ring-like member 13 fixedly attached to the core 12 includes three lips 13a at a front end thereof, the lips 13a are brought into contact with the slinger 14, and an inner space of the bearing portion 1 is sealed against an outer space of the bearing portion 1.

Further, the first seal member 11 restrains invasion of muddy water, sand, dust or the like from an outer portion of a seal portion of the first seal member 11 per se by arranging the slinger 14 such that a gap (labyrinth) between a diameter direction portion 14a in a circular ring shape of the slinger 14 and an axial direction portion 12a in a circular cylinder shape of the core 12 becomes as small as possible. Thereby, a sealing property of the first seal member 11 is promoted.

Further, the first seal member 11 is a so-to-speak pack seal formed in a pack state by integrating the elastic ring-like member 13 fixedly attached to the core 12 and the slinger 14. Further, the first seal member 11 is fitted to between the inner ring 2 and the outer ring 3 after integrating the inner ring 2, the outer ring 3, the retainer 5 and the roller 4 to constitute one member.

A second seal member 15 is arranged on an outer side in an axial direction of the first seal member 11 arranged at the opening portion on the inner side of the inner ring 2 and the outer ring 3 constituted as described above.

The second seal member 15 includes a core 16 comprising a cold rolled steel sheet, stainless steel or the like having a section substantially in an L-like shape fixed to an outer peripheral face and an end face of the outer ring 1, an elastic ring-like member 17 comprising, for example, rubber fixedly attached to an end portion of the core 16 on a side of the end face of the outer ring, and an outward attached slinger 18 made of a metal having a section in a channel-like shape including a portion 18a having a section in an L-like shape opposed to the core 16 and the elastic ring-like member 17 to cover the core 16 and the elastic ring-like member 17 and a portion 18b in a circular cylinder shape fixed to the inner ring 2.

Further, the outward attached slinger 18 is fixed to the inner ring 2 by fitting to fix the circular cylinder shape portion 18b of the outward attached slinger 18 having the section in the channel-like shape to a peripheral face of the inner ring 2.

Further, also the second seal member 15 prevents invasion of muddy water, sand, dust or the like from an outer portion to a seal portion of the second seal member 15 per se by arranging the outward attached slinger 18 such that a gap (labyrinth) between a front end of the portion 18a having the section in the L-like shape of the outward attached slinger 18 and a portion 16a on a side of the outer ring extended in a diameter direction of the core 16 becomes as small as possible.

Further, a single lip 17a is provided on an outer side of the elastic ring-like member 17, and the lip 17a is brought into contact with an inner face of the outward attached slinger 18 to seal the gap (labyrinth) between a diameter direction portion 14a of the slinger 14 and the axial direction portion 12a of the core 12 of the first seal member 11.

The outward attached slinger 18 of the second seal member 15 is formed by pressing a metal sheet having an elasticity such as, for example, a stainless steel sheet or a surface-treated steel sheet, an outer diameter of the axial direction portion in the circular cylinder shape of the portion 18a having the section in the L-like shape is more or less larger than an outer diameter of the outer ring 3 and is formed by a size of covering the portion 16*a* on the outer ring side extended in the diameter direction of the core 16.

According to the bearing portion 1 constituted as described above, for example, the inner ring 2 is fixed to a fixed shaft or a sleeve or the like mounted thereto, and the outer ring 3 is attached with the wheel plate 8 and the brake plate 9 of the wheel by the bolt 7 fixed to the bolt hole 6*a* of the flange 6 and is rotated along with the core 16 of the second seal member 15.

According to Embodiment 1, the second seal member 15 is arranged on the outer side in the axial direction of the first seal member 11 arranged at the opening portion on the inner side of the inner ring 2 and the outer ring 3 of the bearing portion 1 of the bearing apparatus for the axle to which muddy water is easy to be splashed, and therefore, it is difficult to directly splash muddy water to the first seal member 11, and therefore, damage of the first seal member 11 is restrained, and invasion of a foreign matter of muddy water, sand, dust or the like from the inner side to inside of the bearing portion 1 is prevented over a long period of time.

Further, the second seal member 15 is constituted by including the core 16 having the section substantially in the L-like shape fixed to the outer peripheral face and the end face of the outer ring 1, the elastic ring-like member 17 fixedly attached to the end portion on the side of the end face of the outer ring of the core 16, and the outward attached slinger 18 made of a metal having the section in the channel-like shape opposed to the core 16 and the elastic ring-like member 17 and fixed to the inner ring 2 to cover the core 16 and the elastic ring-like member 17 and having the portion 18*a* of the section in the L-like shape and the circular cylinder shape portion 18*b*, the lip 17*a* provided on the outer side of the elastic ring-like member 17 is brought into contact with the inner face of the portion 18*a* of the section in the L-like shape of the outward attached slinger 18, and therefore, the lip 17*a* hampers a foreign matter or the like of muddy water, sand, dust or the like invaded from the gap between the outward attached slinger 18 and the core 16, thereby, the foreign matter hardly reaches the first seal member 11, and therefore, muddy water can be hampered from being splashed directly to the first seal member 11, invasion of muddy water from the inner side to inside of the bearing portion 1 can be prevented over a long period of time, and the bearing apparatus for an axle having a high reliability which is free of maintenance over a long period of time can be provided.

Embodiment 2

Figure 5:
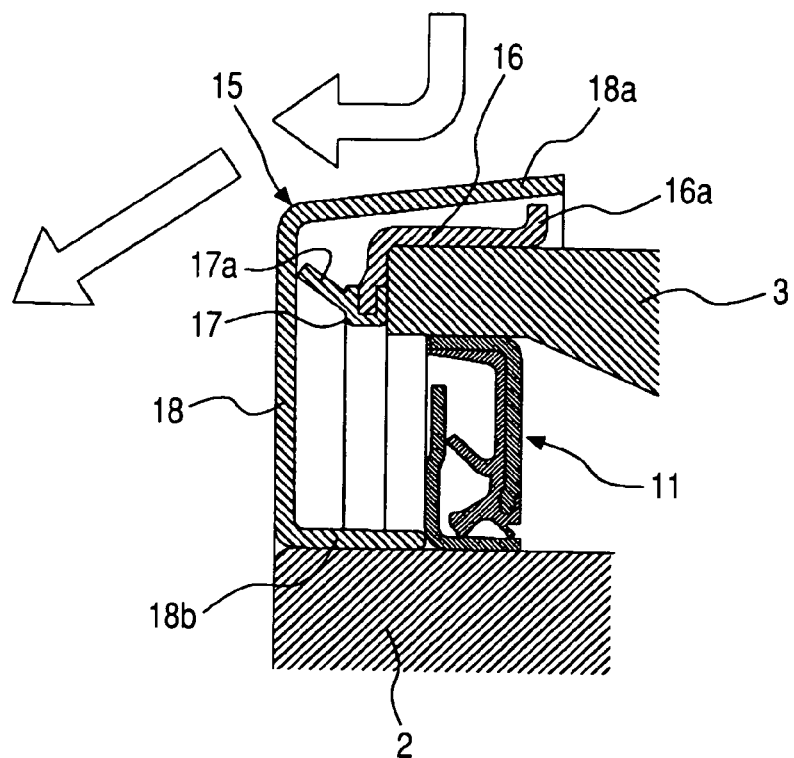
FIG. 5 is a vertical sectional view showing a seal portion on an upper side of a bearing apparatus for an axle according to Embodiment 2 of the invention.
Figure 6:
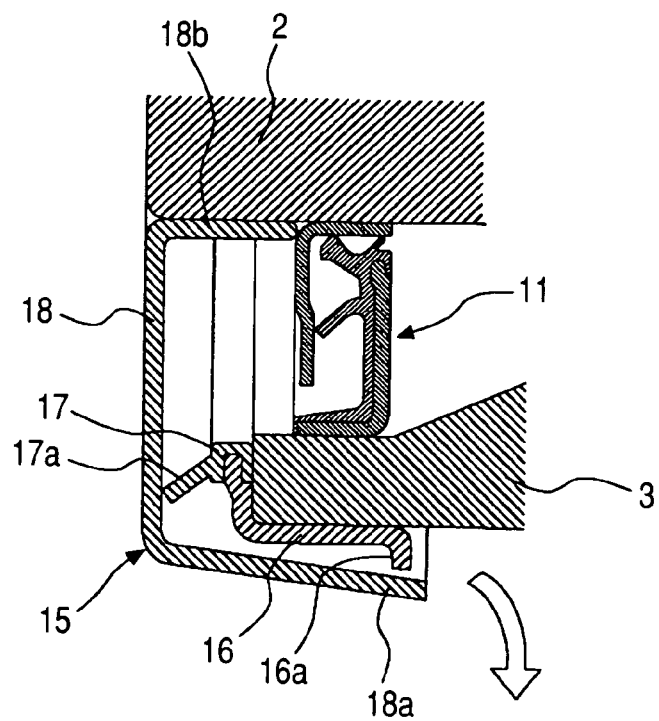
FIG. 6 is a vertical sectional view showing a lower side portion of the seal member of the bearing apparatus for an axle.

FIG. 5 is a vertical sectional view showing an upper side portion of a seal member of a bearing apparatus for an axle according to Embodiment 2 of the invention, and FIG. 6 is a vertical sectional view showing a lower side portion of the seal member of the bearing apparatus for an axle.

In Embodiment 2 of the invention, constitutions thereof similar to those of Embodiment 1 are attached with the same notations and an explanation of a duplicated constitution will be omitted.

According to Embodiment 2, the constitution of the outward attached slinger 18 having the section in the channel-like shape of the second seal member 15 differs from that of Embodiment 1.

That is, although according to Embodiment 1, the outward attached slinger 18 includes the portion 18*a* having the section in the L-like shape and the circular cylinder shape portion 18*b*, and the circular cylinder shape portion of the portion 18*a* having the section in the L-like shape of the outward attached slinger 18 covering the core 16 is in parallel with an outer peripheral face of the outer ring 1, the circular cylinder shape portion covering the core 16 of the portion 18*a* having the section in the L-like shape of the outward attached slinger 18 of Embodiment 2 is not in parallel with the outer peripheral face of the outer ring 1 but includes an inclined face having a small diameter on the outer side in the axial direction and a large diameter on the inner side, in which the diameter is gradually increased as proceeding to the inner side.

In this way, the circular cylinder shape portion covering the core 16 of the portion 18*a* having the section in the L-like shape of the outward attached slinger 18 of the second seal member 15 is not in parallel with the outer peripheral face of the outer ring 1 but includes the inclined face having the small diameter on the outer side in the axial direction and the large diameter on the inner side in which the diameter is gradually increased as proceeding to the inner side, and therefore, as shown by FIG. 5, at upper side portions of the first and the second seal members 11, 15 (when disposed on upper side), water adhered to an inclined face of the circular cylinder shape portion covering the core 16 of the portion 18*a* having the section in the L-like shape of the outward attached slinger 18 flows to other end side portion covering the elastic ring-like member 17 of the outward attached slinger 18, finally drops to a lower side of an outer portion. Therefore, the water hardly invades the gap between the outward attached slinger 18 and the core 16 of the second seal member 15.

Further, muddy water invading the gap between the outward attached slinger 18 and the core 16 of the second seal member 15 flows out to an outer portion from the gap between the outward attached slinger 18 and the core 16 since as shown by FIG. 6, at lower side portions of the first and the second seal members 11, 15 (when disposed on the lower side), the circular cylinder shape portion covering the core 16 of the portion 18*a* of the section in the L-like shape of the outward attached slinger 18 is inclined downward, and therefore, muddy water can further be hampered from being splashed to the first seal member 11.

Further, although there is shown an example in which an inclined face of the circular cylinder shape portion covering the core 16 of the portion 18*a* of the section in the L-like shape of the outward attached slinger 18 is constituted by a linear shape in view of a section thereof, the inclined face can be constituted by various shapes of a curve, a combination of linear lines having different inclinations and the like, and the shape may be constituted by a shape having an operation of making water or the like flow.

Figure 7:
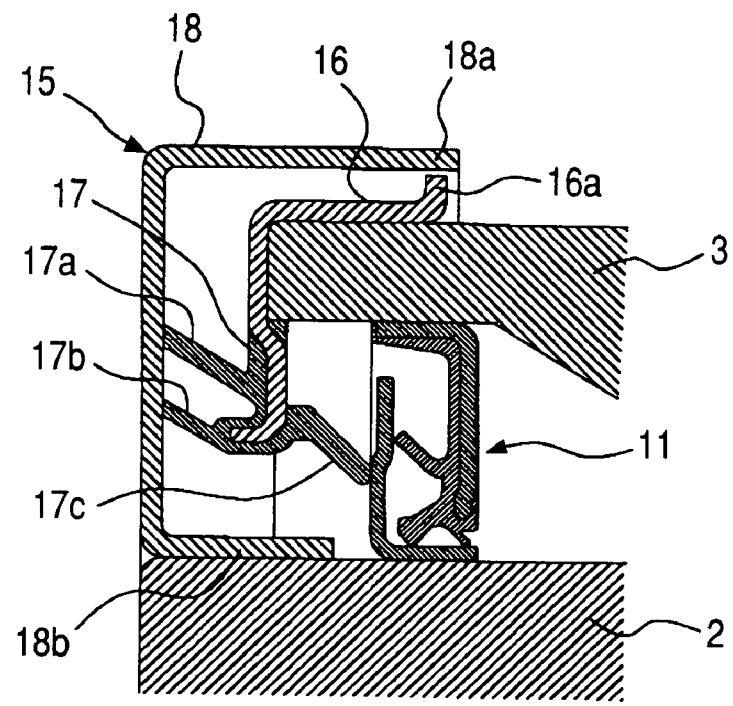
FIG. 7 is a vertical sectional view showing an upper side portion of a seal member of a bearing apparatus for an axle according to Embodiment 3 of the invention.

FIG. 7 is a vertical sectional view showing an upper side portion of a seal member of a bearing apparatus for an axle according to Embodiment 3 of the invention.

In Embodiment 3 of the invention, constitutions similar to those of Embodiment 1 are attached with the same notations and an explanation of a duplicated constitution will be omitted.

Embodiment 3 differs from Embodiment 1 in the constitution of the elastic ring-like member 17 of the second seal member 15.

That is, although in Embodiment 1, the elastic ring-like member 17 includes only one of the lip 17*a* brought into contact with the inner face of the outward attached slinger 18, the elastic ring-like member 17 of Embodiment 3 includes three lips 17*a*, 17*b*, 17*c*.

According to the elastic ring-like member 17 of Embodiment 3, in three of the lips 17*a*, 17*b*, 17*c*, two lips 17*a*, 17*b* are brought into contact with the inner face of the outward attached slinger 18, the one lip 17c is brought into contact with the outer face of the slinger 14 of the first seal member 11.

In this way, by providing three lips 17a, 17b, 17c in the elastic ring-like member 17, bringing the two lips 17a, 17b into contact with the inner face of the outward attached slinger 18 and bringing the one lip 17c into contact with the outer face of the slinger 14 of the first seal member 11, a foreign matter of muddy water, sand, dust or the like invading the gap between the outward attached slinger 18 and the core 16 of the second seal member 15 can be hampered by three lips 17a, 17b, 17c of the elastic ring-like member 17, the foreign matter hardly reaches the first seal member 11, and therefore, the first seal member 11 can further be hampered from being splashed with muddy water directly, and invasion of the foreign matter of muddy water, sand, dust or the like can be prevented from the inner side to inside of the bearing portion 1 over a long period of time.

Further, although in Embodiment 3, according to the constitution of the outward attached slinger 18, the outward attached slinger 18 includes the portion 18a of the section in the L-like shape and the circular cylinder shape portion 18b similar to Embodiment 1, the circular cylinder shape portion covering the core 16 of the portion 18a of the section in the L-like shape of the outward attached slinger 18 is in parallel with the outer peripheral face of the outer ring 1, the circular cylinder shape portion covering the core 16 of the portion 18a of the section in the L-like shape of the outward attached slinger 18 of Embodiment 2 may not naturally be in parallel with the outer peripheral face of the outer ring 1 but may include the inclined face having the small diameter on the outer side in the axial direction and the large diameter on the inner side in which the diameter is gradually increased as proceeding to the inner side.

Figure 8:
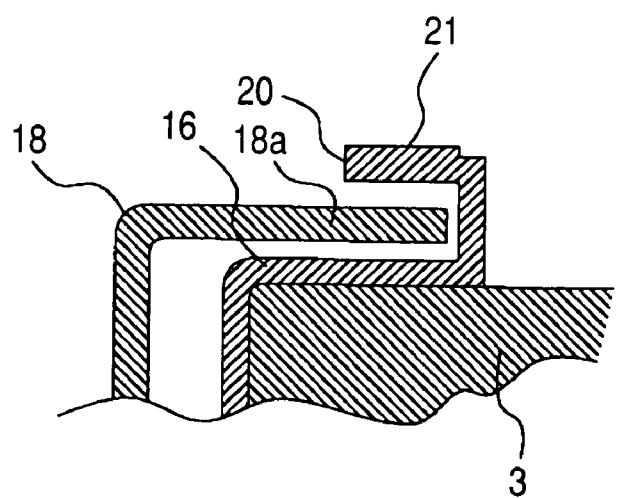
FIG. 8 is a vertical sectional view showing a portion of an upper side portion of a seal member of a bearing apparatus for an axle according to Embodiment 4 of the invention.

FIG. 8 is a vertical sectional view showing a portion on an upper side portion of a seal member of a bearing apparatus for an axle according to Embodiment 4 of the invention.

According to Embodiment 4, an end portion on an outer side of the core 16 of the second seal member 15 of the bearing portion 1 according to Embodiment 1 is extended to ride over the one end side of the circular cylinder shape portion covering the core 16 of the portion 18a of the section in the L-like shape of the outward attached slinger 18 and folded to bend to an upper side, thereafter, folded to bend to an inner side to form an outer peripheral portion 20 which is substantially horizontal and is constituted by a circular cylinder shape, a number of recesses and projections 21 in a shape of a gear, a shape of a wave, a shape of combteeth or the like are formed in a peripheral direction of an outer peripheral face of the outer peripheral portion 20, and a pulsar portion in a circular cylinder shape having a function equivalent to that of a pulsar ring is provided.

Further, the pulsar portion may be constituted by forming the number of recess and projection portions 21 in a peripheral direction of an end face of the second seal member 15 in a shape of a circular ring (circular plate shape) at the second seal member 15 in place of the pulsar portion in the circular shape described above. Further, a pulsar function of the pulsar portion may be of a magnetized type by fixing and forming magnetized rubber or plastic.

According to Embodiment 4, an operation and effect similar to those of the case of Embodiment 1 can be achieved, further, the pulsar portion is provided at the outer peripheral portion 20 of the second seal member 15 provided at the bearing portion 1, and therefore, rotation can be detected firmly by a simple structure without mounting the pulsar ring a weight and a dimension of which are large and which is troublesome in being fabricated and integrated to the outer ring 3.

Further, the bearing apparatus for an axle of Embodiment 4 is naturally applicable also to the bearing apparatus for an axle of Embodiment 2.

Further, although according to the bearing apparatus for an axle of Embodiments 1 through 4, an explanation has been given of the bearing portion 1 of the outer ring rotating type, the invention is naturally applicable also to a bearing portion of an inner ring rotating type.

Further, although an explanation has been given of an example having a circular cone roller bearing as the bearing apparatus for an axle of Embodiments 1 through 4, the invention is naturally applicable to a bearing of a style of a ball bearing or the like.

What is claimed is:

1. A bearing apparatus for an axle, the bearing apparatus comprising:
   an inner ring;
   an outer ring;
   a rolling element arranged between the inner ring and the outer ring;
   a first seal member arranged at an opening portion between the inner ring and the outer ring; and
   a second seal member arranged on an outer side, in an axial direction, of the first seal member, such that the first seal member is disposed between the rolling element and a portion of the second seal member,
   wherein the second seal member includes a core fixed to the outer ring, an elastic ring member fixedly attached to the core and including at least one lip, and an outward attached slinger comprising a portion of a substantially L-shaped section fixed to the inner ring to cover the core and the elastic ring member.

2. The bearing apparatus for an axle according to claim 1, wherein a portion covering the core of the outward attached slinger includes an inclined face having a small diameter on an outer side in an axial direction and a large diameter on an inner side thereof.

3. The bearing apparatus for an axle according to claim 1, wherein the second seal member includes a pulsar portion comprising a circular ring shape or a circular cylinder shape.

4. The bearing apparatus for an axle according to claim 1, wherein the inner ring is fixed to the axle, and the outer ring includes a flange coupled with a brake plate of a wheel.

5. The bearing apparatus for an axle according to claim 1, wherein the elastic ring member contacts the outer ring.

6. The bearing apparatus for an axle according to claim 1, wherein a portion of the elastic ring member is disposed between the core and the outer ring.

7. The bearing apparatus for an axle according to claim 1, wherein a portion of the elastic ring member is disposed between the core and an axially outer end of the outer ring.

8. The bearing apparatus for an axle according to claim 1, wherein the core abuts the first seal member.

9. The bearing apparatus for an axle according to claim 1, wherein the first seal member comprises:
   a first seal core disposed on the outer ring;
   a first seal elastic member fixed to the first seal core; and
   a first seal slinger disposed on the inner ring.

10. The bearing apparatus for an axle according to claim 1, wherein the first seal member is disposed between the rolling element and the elastic ring member of the second seal member.

11. The bearing apparatus for an axle according to claim 1, wherein the first seal member is disposed between, in the axial direction, the rolling element and the elastic ring member of the second seal member.

12. The bearing apparatus for an axle according to claim 1, wherein a portion covering the core of the outward attached slinger includes an inclined face, and
wherein a diameter of an outer side, in the axial direction, of a radially outer periphery of the inclined face is less than a diameter of an inner side, in the axial direction, of the radially outer periphery of the inclined face.

13. The bearing apparatus for an axle according to claim 1, wherein the core includes a radially outward extending portion, and
wherein the substantially L-shaped section is disposed relative to the radially outward extending portion so as to form a gap in a radial direction.

14. The bearing apparatus for an axle according to claim 1, wherein the lip contacts the first seal member.

15. The bearing apparatus for an axle according to claim 1, wherein the lip comprises a plurality of lips, and
wherein a lip of the plurality of lips contacts the first seal member.

16. The bearing apparatus for an axle according to claim 1, wherein an axially innermost portion of the slinger is disposed axially inward of an axially innermost portion of the core.

17. The bearing apparatus for an axle according to claim 1, wherein the core includes a radially extending portion extending from an axially innermost portion of the core, and a cylindrical portion extending axially outward from the radially extending portion.

18. The bearing apparatus for an axle according to claim 17, wherein the cylindrical portion includes a pulsar portion.

* * * * *